United States Patent Office 2,866,602
Patented Dec. 30, 1958

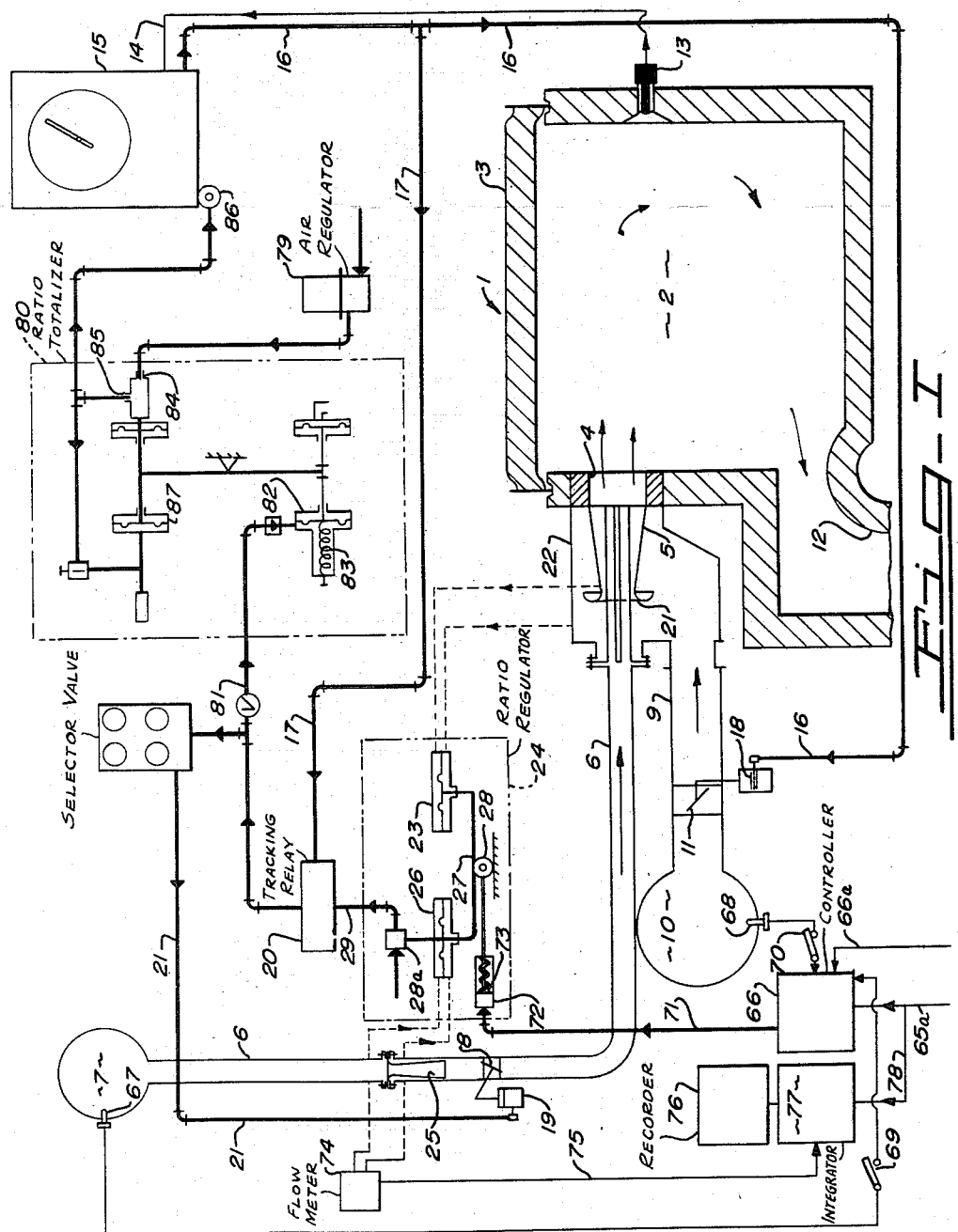

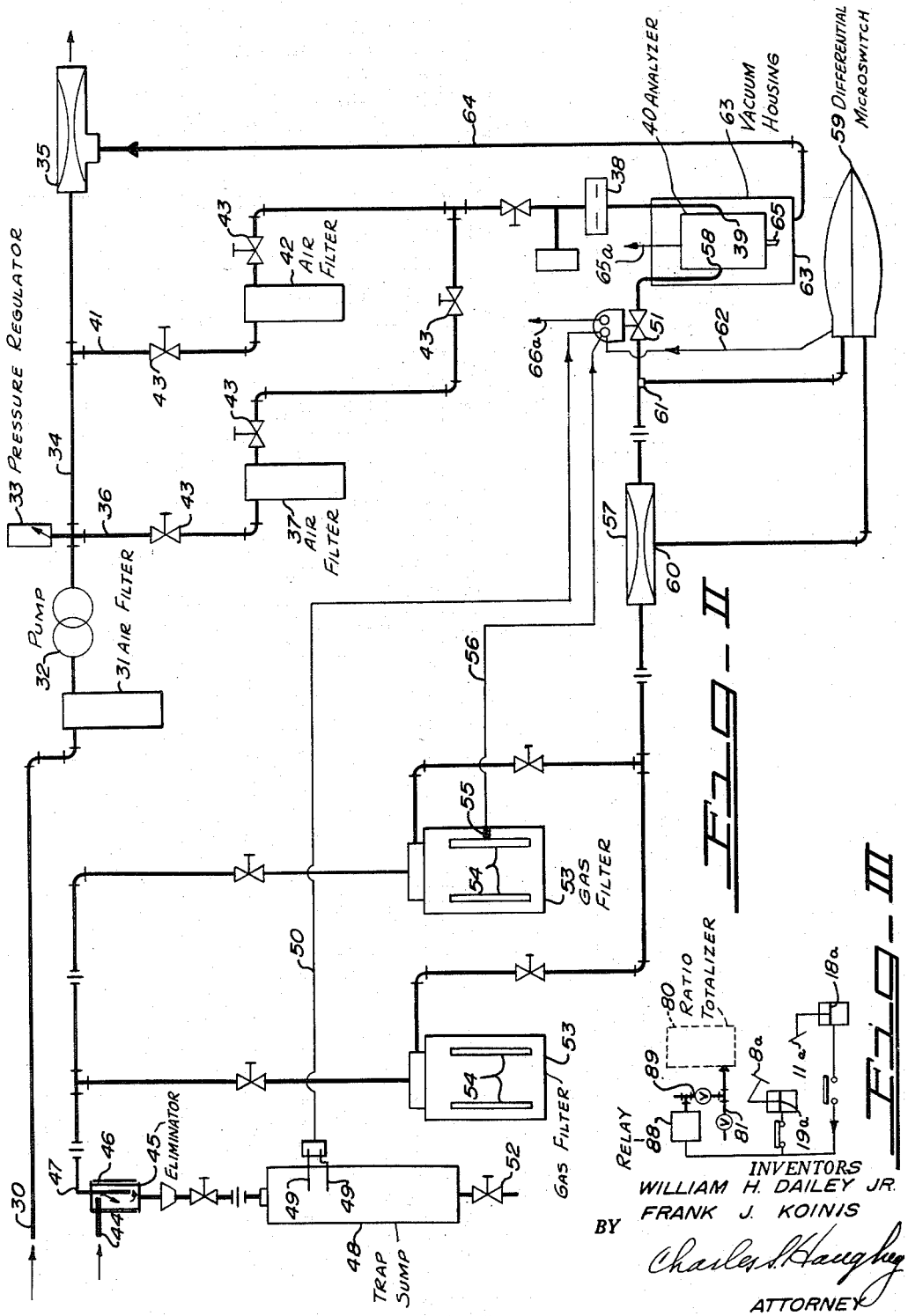

2,866,602

APPARATUS FOR BURNING FUEL HAVING A WIDELY VARYING CALORIFIC VALUE

William H. Dailey, Jr. and Frank J. Koinis, Toledo, Ohio, assignors to Surface Combustion Corporation, Toledo, Ohio, a corporation of Ohio Application December 8, 1954, Serial No. 473,808

18 Claims. (Cl. 236—15)

This invention relates to combustion control systems, and more particularly to apparatus for burning fuel having a widely varying calorific value.

Such apparatus is especially useful in high temperature heating furnaces such as soaking pits in steel mills. The mixture of by-product gasses available in a steel mill has a variable composition and may include gases exhausted from blast furnaces and gases produced in coke ovens, the calorific value of the former gases being relatively low, and the calorific value of the latter gases being relatively high. Because of variations in the amounts of blast furnace gas and coke oven gas which are available at various times, the mixture of by-product gases that is burned as a fuel in steel mills has a widely varying calorific value. Every time the calorific value of fuel gas changes, there is a corresponding change in the proportion of air required for efficient combustion of the fuel gas. In addition to supplying a constant weight of air for each B. t. u. in the fuel gas, it is also necessary, of course, to vary the total amount of the resulting mixture supplied to the furnace whenever there is a call for a variation in the amount of heat generated in the furnace. The ratio of air to fuel gas is very critical, since excess air cools off the furnace and excess fuel gas is, of course, expensive and creates dangerous conditions, e. g., the excess fuel gas ignites and burns as it comes out of covers and stacks.

In many steel mills fuels of very low calorific value are used, e. g., blast furnace gas or mixed gas containing about ten parts of blast furnace gas to one part of coke oven gas. Such mills may have a limited fuel capacity and during the periods of high total fuel demand the fuel supply may not be sufficient to maintain the correct fuel-air ratio to the burner at the maximum burner firing rate.

The principal object of this invention is to provide, in apparatus for burning fuel having a widely varying calorific value, means for continuously correcting the proportions of air and fuel admixed for combustion, the means for correcting being governed by a signal which is an integration of signals received from a meter for constantly determining the calorific value of the fuel and from instruments responsive to the combustion air temperature and to the fuel temperature.

Another object of the invention is to provide, in apparatus for burning fuel having a widely varying calorific value, automatic control means for limiting maximum burner input during periods of low fuel availability, whereby the correct proportion of air and fuel admixed for combustion is maintained.

A further object of the invention is to provide, in apparatus for burning fuel having a widely varying calorific value, means for compensating a recorder, whereby the recorder indicates constant calorific value for a given heat input to a furnace, the means for compensating being responsive to signals received from a meter for constantly determining the calorific value of the fuel and from a meter for determining the volumetric flow of the fuel.

More specific objects and advantages are apparent from the following description, in which reference is had to the accompanying drawings illustrating a preferred embodiment of the invention.

Figure I is a diagrammatic view of a soaking pit with the present apparatus for burning fuel having a widely varying calorific value applied thereto.

Figure II is a diagrammatic view of a fuel sampling and purifying system and of a meter for constantly determining the calorific value of the sampled fuel.

Figure III is a diagrammatic view of equipment used in converting the apparatus shown in Figure I from a pneumatic combustion control system to a hydraulic combustion control system.

These specific drawings and the specific description that follows merely disclose and illustrate the invention, and are not intended to impose limitations upon the claims.

Apparatus embodying the invention for burning fuel having a widely varying calorific value includes a furnace, a sampling system for constantly sampling the fuel, a first meter for constantly determining the calorific value of the sampled fuel, a burner connected to the furnace for combustion of the fuel in admixture with air, a regulator for determining the proportions of air and fuel admixed for combustion, a first metering orifice for the air, a second metering orifice for the fuel, the regulator being responsive to changes in differential pressure in the air stream at the first metering orifice and to changes in differential pressure in the fuel stream at the second metering orifice, an instrument responsive to the temperature of the air to be admixed with the fuel, an instrument responsive to the temperature of the fuel to be admixed with the air, a control device which is responsive both to the first meter and to the temperature responsive instruments and which governs the regulator to vary the proportions of air and fuel both in accordance with variations in the calorific value of the fuel and in accordance with variations in the temperatures of the air and the fuel, a second meter for determining the volumetric flow of fuel, a recorder connected to the second meter, an integrator which is responsive to both meters and which governs the recorder, whereby the recorder indicates constant calorific value for a given heat input to the furnace, a tracking relay connected to the regulator for regulating one of the flows of fuel and air, an element for measuring the temperature within the furnace, control means for limiting maximum burner input during periods of low fuel availability, and a furnace temperature controller which is responsive both to the furnace temperature measuring element and to the control means for limiting maximum burner input and which directly regulates that flow not regulated by the tracking relay, the tracking relay being responsive both to the regulator and to the furnace temperature controller.

Referring to Figure I, a soaking pit or furnace 1 comprises a combined combustion and heating chamber 2 which is normally closed by a cover 3, the chamber normally being of a size to contain a plurality of steel ingots. Heating flame enters the chamber 2 from a firing port 4 whose inlet is coincident with the outlet of a burner 5 to which fuel is delivered by a supply pipe 6 communicating with a fuel header 7 and having a fuel control valve 8. Air for combustion is delivered to the burner 5 by a duct 9 communicating with a combustion air header 10 and having an air control valve 11. Flue gas or products of combustion is vented from the chamber 2 through an exhaust port 12. The direction of flow of the fuel, combustion air and flue gas is indicated by arrows in Figure I.

An element 13 for measuring the temperature within the furnace 1 is located in the wall of the furnace and transmits an electrical signal through a lead 14 to a furnace temperature controller 15 which converts the electrical signal to a pneumatic signal. The pneumatic signal is a measure of the heat demand of the furnace 1 and is transmitted from the controller 15 through lines 16 and 17. The pneumatic signal in line 16 directly operates an air valve piston 18 positioning the air control valve 11 and the pneumatic signal in line 17 indirectly operates a fuel valve piston 19 positioning the fuel control valve 8 through a tracking relay 20 connected to the fuel valve piston 19 by a line 21. The specific arrangement shown in Figure I wherein the pneumatic signal from the temperature controller 15 operates the air valve piston 18 directly and the fuel valve piston 19 indirectly through the tracking relay 20 may be reversed, i. e., the tracking relay 20 may be connected to the air valve piston 18 so that the pneumatic signal from the temperature controller indirectly operates the air valve piston 18 and directly operates the fuel valve piston 19.

The air control valve 11 controls the amount of combustion air to the burner 5, which air is metered at an air metering orifice 21 located in a burner air box 22. The differential pressure developed across the throat of the metering orifice 21 is sent to an air diaphragm 23 of a ratio regulator 24 which determines the proportions of air and fuel admixed for combustion. Similarly, the differential pressure developed across the throat of a fuel metering orifice 25 located in the supply pipe 6 is sent to a fuel diaphragm 26 of the ratio regulator 24. The ratio regulator 24 operates on a force-balance principle, i. e., the regulator maintains an equilibrium between the diaphragms 23 and 26, the equilibrium being affected by forces on the diaphragms and the ratio of lever arms 27 supporting the diaphragms. The lever arms 27 are fulcrumed on an adjustable pivot 28 mounted in the ratio regulator 24. The ratio regulator 24, which receives its power air through a supply air port 28a, transmits a pneumatic loading signal through a line 29 to correct the tracking relay 20. The tracking relay 20 which is thus responsive both to the ratio regulator 24 and to the furnace temperature controller 15 sends a corrected pneumatic signal through the line 21 positioning the fuel valve piston 19 and increasing or decreasing the flow of fuel to keep enough force on the fuel diaphragm 26 to balance the air diaphragm 23 so that a constant fuel-air ratio is maintained.

It is necessary to vary the total amount of fuel and air supplied to the burner 5 whenever there is a call for a variation in the amount of heat generated by the burner. Such a variation in the amount of the fuel-air mixture supplied to the burner may be accomplished by directly controlling the flow of the fuel-air mixture by means of a valve. However, it is often more convenient to control the heat output of the burner indirectly by controlling the flow of either the air supply or the fuel gas supply. It is possible to vary the heat output of the burner by thus varying the flow of either the air supply or the fuel supply, because when that is done the equipment hereinbefore described will make a corresponding adjustment in the flow of the other component so as to maintain a constant fuel-air ratio. Thus the result of varying either the flow of the air supply or the flow of the fuel supply will be to cause a corresponding variation in the flow of the fuel-air mixture to the burner 5.

It has not been possible, heretofore, as a practical matter to regulate the proportion of air that is mixed with the fuel so that the proportion of air in the fuel-air mixture that is supplied to the burner always creates the correct ratio for most efficient combustion because of variations in the calorific value of the fuel, variations in the temperatures of the fuel and of the combustion air, and occasional insufficient supplies of fuel. The ratio regulator 24 therefore in addition to being responsive to changes in differential pressure in the air stream and in the fuel stream at the metering orifices 21 and 25, as hereinbefore described, is governed by a signal which is an integration of signals received from instruments responsive to the temperature of the air to be admixed with the fuel and to the temperature of the fuel to be admixed with the air and to a meter for constantly determining the calorific value of the fuel.

Referring to Figure II, a sampling system for constantly sampling the fuel is provided and includes an air supply system comprising an atmospheric air inlet 30 leading to an incoming air filter 31. An ordinary pump 32 forces the air through a relief valve and pressure regulator 33 which divides the stream of air, one part flowing through a line 34 to provide power air for a sample gas jet pump or eductor 35 and the other part flowing through a branch line 36, an air filter 37 and a flow limiting orifice 38 to provide power air to a compressed air inlet 39 of an analyzer or meter 40 for constantly determining the calorific value of the sample gas. A stand by branch line 41 having an air filter 42 is used instead of the branch line 36 and its air filter 37 when the line 36 or its air filter 37 are cleaned or replaced, hand valves 43 being provided in the lines 36 and 41 for making the change over.

The system also includes gas sampling and purifying apparatus comprising a sampling line 44 connected to a supply of the fuel gas in the fuel header 7 to be analyzed. The sampling line 44 is connected to the jet pump 35 which creates a vacuum drawing the sample gas constantly thorugh the sampling and purifying system. However, any suitable means which does not change characteristics of the sample may be used to propel or draw the sample gas through the system. It is possible for the analyzing apparatus to function by withdrawing a small sample at frequent intervals, but ordinarily the apparatus functions by withdrawing a small continuous stream of fuel gas. The gas to be analyzed flows through an eliminator 45 surrounded by a heater 46 maintaining a temperature in the gas above the dew point of the gas so that all moisture entering in droplet form will be vaporized and the sample gas, as measured in the analyzer 40, will be handled on a wet basis. The moisture contained in the gas sample must be re-evaporated by the heater so that the true gas sample measured in the analyzer 40 will have the same characteristics as the gas subsequently burned and metered in the combustion system. The eliminator 45 includes a passage having an abrupt change in direction, the sample gas flowing upward through a line 47 and surges or slugs of liquid water entering the eliminator with the gas dropping downward into a large moisture trap sump 48 connected below the eliminator. The sump 48 is fitted with a pair of electrodes 49 near the top of the sump so that, if the water level in the sump rises sufficiently to cover the electrodes and make an electrical connection therebetween, an electrical circuit through a lead 50 is completed to a solenoid of a solenoid operated shutoff valve 51 connected to the analyzer 40 closing the valve 51 and turning off the system to avoid flooding the analyzer in the event that excessive surges of liquid water enter the sampling line 44. Waste water is drained from the sump 48 at required intervals through a hand valve 52.

The gas flows through the line 47 to either or both of a pair of special felt gas filters 53 each equipped with a pair of filter band heaters 54 to maintain the gas sample at a temperature above its dew point. Only one of the gas filters 53 is required for full operation, the other may be kept in stand by reserve. The gas filters 53 are provided to remove finely divided solids from the gas and the band heaters 54 are provided for the same reason, hereinbefore set forth, as the heater 46 surrounding the eliminator 45. Thermoswitches 55, one of which is shown, are incorporated one in each of the filter heaters 54 and keep open an electrical circuit through leads 56, one of which is shown, to the solenoid of the solenoid operated shutoff valve 51 until the gas filters 53 are up to control temperature, i. e., slightly above the dew point of the gas.

The cleaned sample gas containing moisture in vaporized form flows from the gas filters 53, through a venturi 57 and through the shutoff valve 51 to a gas sample inlet 58 of the analyzer 40. The sample gas may be burned in the analyzer with either excess air or deficient air and the flue products analyzed by either an oxygen recorder or combustibles analyzer. A differential microswitch 59 is connected between a throat tap 60 in the venturi 57 and a downstream tap 61. In case of a drop in the gas sample flow below that required for accurate operation of the venturi 57, the solenoid of the solenoid operated shutoff valve 51 is energized by the closing of an electrical circuit in the differential microswitch 59 to close the shutoff valve and interrupt the flow of the gas sample, the microswitch being connected to the solenoid of the shutoff valve 51 through a lead 62.

The jet pump 35 is provided to draw the gas sample through the gas sampling and purifying system and through the analyzer 40 with enough force to overcome the pressure drop through the small lines and felt filters and is connected to the analyzer by means of a vacuum housing 63 within which the analyzer is suitably mounted. The jet pump 35 is connected to the housing 63 through an exhaust line 64 and continuously maintains a vacuum within the housing. A sample chamber in the analyzer 40 is connected to the gas sampling and purifying system through the gas inlet 58 and a gas sample continuously enters the chamber under the influence of the vacuum within the housing 63 to be burned and analyzed. After combustion, gases are exhausted from the analyzer 40 through a discharge tube 65 and are drawn from the housing 63 by the action of the jet pump 35.

The electrical output of the analyzer 40 which is proportional to the amount of combustibles present in the gas sample on a wet basis is transmitted through a lead 65a, shown in both Figures I and II, to an ordinary integrator or control device 66 governing the ratio regulator 24 in accordance with variations in the calorific value of the fuel. However, in the event that the shutoff valve 51 (Figure II) is closed for any reason, an electrical circuit is completed through a lead 66a, shown in both Figures I and II, to the control device 66 automatically switching the control device from governing the ratio regulator 24 in accordance with variations in the calorific value of the fuel to governing the ratio regulator in accordance to a fixed fuel-air ratio setting. The fixed setting is preselected so that in the event of failure of the automatic control system a preselected, safe fuel-air ratio is resorted to. The control device 66 is normally responsive both to the electrical output of the analyzer 40 and to instruments 67 and 68 located in the headers 7 and 10 respectively and responsive to the temperatures of the fuel and of the combustion air. The instrument 67 located in the fuel header 7 is connected to the control device 66 through a switch 69 and the instrument 68 located in the combustion air header 10 is connected to the control device 66 through a switch 70. The control device 66 transmits a pneumatic signal through a line 71 to a pneumatic cylinder 72 in the ratio regulator 24, which pneumatic signal represents the product of the calorific value of the fuel times the absolute temperature of the combustion air, the product divided by the absolute temperature of the fuel.

Governing the ratio regulator 24 by the pneumatic signal from the control device 66, which pneumatic signal is an integration of electrical signals received from the analyzer 40 and from the instruments 67 and 68, solves the problems that arise from the widely varying calorific value of the gas that is to be burned as a fuel and the fact that a constant weight of air must be supplied for each B. t. u. in the fuel gas. It is often desirable to preheat either or both the air supply or the fuel supply, and when this is done the temperatures of the combustion air or the fuel gas may vary. The instruments 67 and 68 generate electrical current that varies with changes in the temperatures of the air and fuel, and the control device 66 responds to such current as well as to the electrical current generated by the analyzer 40, so that the control device 66 which governs the ratio regulator 24 varies the number of cubic feet of air per cubic foot of fuel in proportion to the calorific value of the fuel and also in proportion to the temperature of the air and of the fuel. If the combustion air or the fuel gas is supplied at a constant temperature, the temperature-responsive instrument or instruments are not needed and the control device 66 is then made responsive to only the analyzer 40 or to the analyzer and the proper one of the temperature-responsive instruments 67 and 68. A piston 73 in the cylinder 72 changes the position of the adjustable pivot 28 according to the signal received from the control device 66 thus changing the fulcrum point of the lever arms 27 and causing the diaphragms 23 and 26 to become unbalanced to cause positioning of the fuel control valve 8, as hereinbefore described.

A fuel flow meter 74 receiving flow impulses from the fuel metering orifice 25 determines the volumetric flow of fuel and is connected by a lead 75 to a recorder 76. An integrator 77 governs the recorder 76, the integrator being responsive to the fuel flow meter 74 and to the analyzer 40 to which it is connected by a lead 78, whereby the recorder 76 indicates constant calorific value for a given heat input to the furnace 1. The integrator 77 transmits a signal to the recorder 76 which represents the product of the volumetric flow of the fuel times the calorific value of the fuel.

As long as there is a sufficient amount of fuel available in the fuel header 7, the apparatus for burning fuel having a widely varying calorific value will supply a mixture of fuel and air having the correct fuel-air ratio to the burner 5. The furnace temperature controller 15 directly causes the air control valve 11 to be positioned and transmits a pneumatic signal to the tracking relay 20. Changing the position of the air control valve 11 causes the ratio regulator 24, which is responsive to changes in differential pressure in the air stream at the air metering orifice 21 and to changes in differential pressure in the fuel stream at the fuel metering orifice 25, to transmit a changed pneumatic loading signal to the tracking relay 20 to correct the pneumatic signal received by the tracking relay 20 from the temperature controller 15, which corrected signal causes the fuel control valve 8 to be correctly positioned allowing the proper amount of fuel to flow to the burner 5. The ratio regulator in addition to being responsive to changes in differential pressure in the air stream and in the fuel stream is also responsive to a signal which is an integration of signals received from the analyzer 40 and from the temperature responsive instruments 67 and 68. However, on many installations where fuels of low calorific value are used, e. g., blast furnace gas or mixed gas containing about ten parts blast furnace gas to one part of coke oven gas, the fuel capacity is limited and during periods of high total fuel demand the fuel supply is not sufficient to maintain the proper fuel-air ratio to the burner 5 at the maximum burner firing rate.

The pneumatic signal from the tracking relay 20 to the fuel valve piston 19 is a direct measurement of the position of the fuel valve 8. The maximum open position that can be assumed by the air valve 11 depends on the maximum supply pressure to the furnace temperature controller 15, which maximum supply pressure is set by a manually controlled air supply regulator 79. If the maximum supply pressure to the controller 15 is decreased, the maximum open position of the air valve 11 will also be decreased and through the tracking relay 20 and the ratio regulator 24 the maximum input to the furnace 1 will be decreased. Control means for limiting maximum burner input during periods of low fuel availability are provided and include a ratio totalizer 80 to automatically decrease the supply air pressure to the temperature controller 15 as a function of the position of the gas valve 8.

As long as the proper amount of fuel is going to the burner 5, the gas valve 8 will be at some postion less than wide open and the pneumatic signal from the tracking relay 20 to the fuel valve piston 19 will be something less than maximum. The ratio totalizer 80 is set to limit the maximum output of the tracking relay 20 so that the maximum open position of the fuel valve 8 is about ninety percent of its wide open position. The pneumatic output signal from the tracking relay 20 is transmitted through a line 81 to a chamber 82 of the ratio totalizer 80. A spring 83 in the chamber 82 is adjusted to limit the maximum value of the output signal from the tracking relay 20 to the value hereinbefore indicated. The output of the manually controlled air supply regulator 79 is fed into a supply port 84 of the ratio totalizer 80. When the pneumatic output signal from the tracking relay 20 is less than the setting of the spring 83, i. e., when the output signal from the tracking relay 20 indicates that the position of the gas valve 8 is at a position less than ninety percent of its wide open position, the signal from the air supply regulator 79 will pass unchanged from the supply port 84 in the ratio totalizer through an output port 85 in the ratio totalizer and the maximum pneumatic supply pressure will be available at a supply port 86 in the furnace temperature controller 15. However, as the fuel valve 8 approaches its wide open position the signal from the output port 85 of the ratio totalizer 80 will decrease to maintain the output signal of the tracking relay 20 at a level limiting the position of the fuel valve 8 to a position less than ninety percent of its wide open position. The output of the ratio totalizer 80 from the port 85 goes both to the supply port 86 of the temperature controller 15 and to a feed back chamber 87 of the ratio totalizer. The purpose of the feed back is to provide reset action in the ratio totalizer, i. e., as long as there is a difference between the output signal from the tracking relay 20 and the reference point set by the spring 83, the output signal from the port 85 will vary to correct the difference.

The combustion controls hereinbefore described and shown are of the pneumatic type. However, the controls can also be electrical, if proper safety precautions are observed, or hydraulic. If the controls are of the hydraulic type, it is not possible to use the output signal from a hydraulic ratio regulator as a measure of the position of the fuel valve 8 or of the air valve 11. In such a case, all of the pneumatic combustion controls hereinbefore described are converted to hydraulic controls which operate in the same manner as the pneumatic controls. The pneumatically operated air valve piston 18 and its air valve 11, and the fuel valve piston 19 and its fuel valve 8 are then hydraulically operated and correspond to a hydraulically operated air valve piston 18a and its air valve 11a, and to a hydraulically operated fuel valve piston 19a and its fuel valve 8a, shown in Figure III. A relay 88, connected into the combustion controls system hereinbefore described, as shown in Figure III, converts an electrical signal which is a direct measurement of the position of one of the valves 11a and 8a driven by the pistons 18a and 19a respectively into a pneumatic signal which is fed through a line 89 into the chamber 82 of the ratio totalizer 80 hereinbefore described, which totalizer limits the position of whichever valve the relay 88 is connected.

Various modifications may be made in specific details of construction without departing from the spirit and scope of the invention.

Having described the invention, we claim:

1. In apparatus for burning fuel having a widely varying calorific value, in combination, a fuel line, a sampling system connected to said fuel line for constantly sampling fuel supplied by said fuel line, a calorific value meter connected to said sampling system for constantly determining and signaling the calorific value of the sampled fuel, a burner for combustion of the fuel in admixture with air, an air line, said burner being connected to said fuel line and said air line, a regulator for determining the proportions of air and fuel admixture for combustion, an instrument responsive to the temperature of the air to be admixed with the fuel, a fuel temperature variation signaling instrument incorporated with said fuel line and responsive to variations in temperature of the fuel to be admixed with the air, a control device which is normally connected to said calorific value meter and is responsive to variations in the calorific value of the fuel and to signals from the temperature-responsive instruments, said control device automatically governing said regulator to vary the proportions of air and fuel both in accordance with variations in the calorific value of the fuel and in accordance with variations in the temperature of the air and the fuel, whereby optimum fuel-air ratios are maintainable, not withstanding varying calorific values and temperatures of the fuel and varying temperatures of the air, a solenoid operated shut-off valve, a plurality of circuits each including contacts closable upon the occurrence of a condition in said sampling system and safety means for causing the control device to govern the regulator in accordance to a fixed fuel-air ratio in the event of failure of the sampling system said safety means including a circuit leading from said solenoid operated shut-off valve to said control device.

2. In apparatus for burning fuel having a widely varying calorific value, in combination, a fuel line, a sampling system connected to said fuel line for constantly sampling fuel supplied by said fuel line, a calorific value meter connected to said sampling system for constantly determining the calorific value of the sampled fuel, a burner for combustion of the fuel in admixture with air, an air line, said burner being connected to said fuel line and said air line, a regulator for determining the proportions of air and fuel admixed for combustion, an air temperature variation signaling instrument incorporated with said air line and responsive to variations in the temperature of the air to be admixed with the fuel, a control device which is normally connected to said calorific value meter and is responsive to variations in the calorific value of the fuel and to signals from the temperature-responsive instrument, said control device automatically governing said regulator to vary the proportions of air and fuel both in accordance with variations in the calorific value of the fuel and in accordance with variations in the temperature of the air, whereby optimum fuel-air ratios are maintainable, not withstanding varying calorific values and temperatures of the air, a solenoid operated shut-off valve, a plurality of circuits each including contacts closable upon the occurrence of a condition in said sampling system and safety means for causing the control device to govern the regulator in accordance to a fixed fuel-air ratio in the event of failure of the sampling system said safety means including a circuit leading from said solenoid operated shut-off valve to said control device.

3. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, an air temperature variation signaling instrument positioned to be responsive to variations in the temperature of the air to be admixed with the fuel, a fuel temperature variation signaling instrument positioned to be responsive to variations in the temperature of the fuel to be admixed with the air, means connected to said calorific value meter, said air temperature variation signaling instrument and said fuel temperature variation signaling instrument for integrating signals therefrom into a governing signal, means for continuously correcting the proportions of air and fuel admixed for combustion in accordance with such governing signal, whereby optimum fuel-air ratios are maintainable, not withstanding varying calorific values of the fuel and varying temperatures of the air and fuel, a fuel flow meter for determining the volumetric flow of fuel, a recorder connected to said fuel flow meter, and a calorific value-fuel flow integrator which is connected to both said calorific value meter and said fuel flow meter and which is connected to and governs said recorder, whereby said recorder indicates heat input to said furnace as the product of the calorific value and corrected fuel flow.

4. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, an instrument responsive to variations in the temperature of the air to be admixed with the fuel, means connected to said calorific value meter and said air temperature variation signaling instrument for integrating signals therefrom into a governing signal, means for continuously correcting the proportions of air and fuel admixed for combustion in accordance with such governing signal, whereby optimum fuel-air ratios are maintainable not withstanding varying calorific values of the fuel and varying temperatures of the air, a fuel-flow meter for determining the volumetric flow of fuel, a recorder connected to said fuel-flow meter, and a calorific value-fuel flow integrator which is connected to both said calorific value meter and said fuel flow meter and which is connected to and governs said recorder, whereby said recorder indicates heat input to said furnace as the product of the calorific value and corrected fuel flow.

5. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, means connected to said calorific value meter for continuously correcting the proportions of air and fuel admixed for combustion in accordance with a signal received from said calorific value meter, a fuel flow meter for determining the volumetric flow of fuel, a recorder connected to said fuel flow meter, a calorific value-fuel flow integrator which is connected to both said calorific value meter and said fuel flow meter and which is connected to and governs said recorder, whereby said recorder indicates heat input to said furnace as the product of the calorific value and corrected fuel flow.

6. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, an air temperature variation signaling instrument positioned to be responsive to variations in temperature of the air to be admixed with the fuel, a fuel temperature variation signaling instrument positioned to be responsive to variations in the temperature of the fuel to be admixed with the air, a control device which is connected to said calorific value meter and is responsive to the calorific value of the fuel and to signals from the temperature-responsive instruments, said control device governing said regulator to vary the proportions of air and fuel both in accordance with variations in the calorific value of the fuel and in accordance with variations in the temperatures of the air and the fuel, a fuel flow meter for determining the volumetric flow of fuel, a recorder connected to said fuel flow meter, and an integrator which is responsive to both meters and which governs said recorder, whereby said recorder indicates heat input to said furnace as the product of the calorific value and corrected fuel flow.

7. In apparatus for burning fuel having a widely varying calorific value, in combination, a furnace, a fuel line for supplying fuel to heat said furnace, a sampling system connected said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, an air temperature variation signaling instrument positioned to be responsive to variations in temperature of the air to be admixed with the fuel, a control device which is connected to said calorific value meter and is responsive to the calorific value of the fuel and to signals from the temperature-responsive instrument, said control device governing said regulator to vary the proportions of air and fuel in accordance with variations in the calorific value of the fuel and in accordance with variations in the temperature of the air, a fuel flow meter for determining the volumetric flow of fuel, a recorder connected to said fuel flow meter, and an integrator which is responsive to both meters and which governs said recorder, whereby said recorder indicates heat input to said furnace as the product of the calorific value and corrected fuel flow.

8. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of the air and fuel admixed for combustion, a control device which is connected to said calorific value meter and is responsive to the calorific value of the fuel, said control device governing said regulator to vary the proportions of air and fuel in accordance with variations in the calorific value of the fuel, a fuel flow meter for determining the volumetric flow of fuel, a recorder connected to said fuel flow meter, and an integrator which is responsive to both meters and which governs said recorder, whereby said recorder indicates heat input to said furnace as the product of the calorific value and corrected fuel flow.

9. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice for the air, a second metering orifice for the fuel, the regulator being responsive to changes in differential pressure in the air stream at the first metering orifice and to changes in differential pressure at the second metering orifice, an air temperature variation signaling instrument positioned to be responsive to variations in temperature of the air to be admixed with the fuel, a fuel temperature variation signaling instrument positioned to be responsive to variations in the temperature of the fuel to be admixed with the air, a control device which is connected to said calorific value meter and is responsive to the calorific value of the fuel and to signals from the temperature-responsive instruments, said control device governing said regulator to vary the proportions of air and fuel both in accordance with variations in the calorific value of the fuel and in accordance with variations in the temperatures of the air and the fuel, a tracking relay connected to the regulator for regulating one of the flows of fuel or air, an element incorporated with said furnace for measuring the temperature within said furnace, and a furnace temperature controller which is responsive to signals from said furnace temperature measuring element and which directly regulates that flow not regulated by the tracking relay, the tracking relay being responsive to signals from both said regulator and said furnace temperature controller.

10. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice for the air, a second metering orifice for the fuel, the regulator being responsive to changes in the differential pressure in the air stream at the first metering orifice and to changes in differential pressure in the fuel stream at the second metering orifice, an air temperature variation signaling instrument positioned to be responsive to variations in the temperature of the air to be admixed with fuel, a control device which is connected to said calorific value meter and is responsive to the calorific value of the fuel and to signals from the temperature responsive instrument, said control device governing said regulator to vary the proportions of air and fuel both in accordance with variations in the calorific value of the fuel and in accordance with variations in the temperature of the air, a tracking relay connected to the regulator for regulating one of the flows of fuel or air, an element incorporated with said furnace for measuring the temperature within said furnace, and a furnace temperature controller which is responsive to signals from said furnace temperature measuring element and which directly regulates that flow not regulated by the tracking relay, the tracking relay being responsive to signals from both said regulator and said furnace temperature controller.

11. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice for the air, a second metering orifice for the fuel, the regulator being responsive to changes in differential pressure in the air stream at the first metering orifice and to changes in differential pressure in the fuel stream at the second metering orifice, a control device which is connected to said calorific value meter and is responsive to the calorific value of the fuel, said control device governing said regulator to vary the proportions of air and fuel in accordance with variations in the calorific value of the fuel, a tracking relay connected to the regulator for regulating one of the flows of fuel or air, an element incorporated with said furnace for measuring the temprature within said furnace and a furnace temperature controller which is responsive to signals from said furnace temperature measuring element and which directly regulates that flow not regulated by the tracking relay, the tracking relay being responsive to signals from both said regulator and said furnace temperature controller.

12. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice for the air, a second metering orifice for the fuel, the regulator being responsive to changes in differential pressure in the air stream at the first metering orifice and to differential changes in the fuel stream at the second metering orifice, an air temperature variation signaling instrument positioned to be responsive to variations in temperature of the air to be admixed with the fuel, a control device which is connected to said calorific value meter and is responsive to the calorific value of the fuel and to signals from the temperature-responsive instrument, said control device governing said regulator to vary the proportions of air and fuel both in accordance with variations in the calorific value of the fuel and in accordance with variations in the temperature of the air, a fuel flow meter for determining the volumetric flow of fuel, a recorder connected to said fuel flow meter and an integrator which is responsive to both meters and which governs said recorder, whereby said recorder indicates heat input to said furnace as the product of the calorific value and corrected fuel flow, a tracking relay connected to the regulator for regulating one of the flows of fuel or air, an element incorporated with said furnace for measuring the temperature within said furnace, and a furnace temperature controller which is responsive to signals from said furnace temperature measuring element and which directly regulates that flow not regulated by the tracking relay, the tracking relay being responsive to signals from both said regulator and said furnace temperature controller.

13. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining proportions of air and fuel admixed for combustion, a first metering orifice for the air, a second metering orifice for the fuel, the regulator being responsive to changes in differential pressure in the air stream at the first metering orifice and to changes in differential pressure in the fuel stream at the second metering orifice, an air temperature variation signaling instrument positioned to be responsive to variations in temperature of the air to be admixed with the fuel, a fuel temperature variation signaling instrument positioned to be responsive to variations in the temperature of the fuel to be admixed with the air, a control device which is connected to said calorific value meter and is responsive to the calorific value of the fuel and to signals from the temperature-responsive instruments, said control device governing said regulator to vary the proportions of air and fuel both in accordance with variations in the calorific value of the fuel and in accordance with variations in the temperatures of the air and the fuel, a fuel flow meter for determining the volumetric flow of fuel, a recorder connected to said fuel flow meter, an integrator which is responsive to both meters and which governs said recorder, whereby said recorder indicates heat input to said furnace as the product of the calorific value of the burner and corrected fuel flow, a tracking relay connected to the regulator for regulating one of the flows of fuel or air, an element incorporated with said furnace for measuring the temperature within said furnace, and a furnace temperature controller which is responsive to the furnace temperature measuring instrument and which directly regulates that flow not regulated by the tracking relay, the tracking relay being responsive to signals from both said regulator and said furnace temperature controller.

14. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice for the air, a second metering orifice for the fuel, the regulator being responsive to changes in differential pressure in the air stream at the first metering orifice and to changes in differential pressure in the fuel stream at the second metering orifice, an air temperature variation signaling instrument positioned to be responsive to variations in temperature of the air to be admixed with the fuel, a control device which is connected to said calorific value meter and is responsive to the calorific value of the fuel and to signals from the temperature-responsive instrument, said control device governing said regulator to vary the proportions of air and fuel both in accordance with variations in the calorific value of the fuel and in accordance with variations in the temperature of the air, a fuel flow meter for determining the volumetric flow of fuel, a recorder connected to said fuel flow meter, an integrator which is responsive to both meters and which governs said recorder, whereby said recorder indicates heat input to said furnace as the product of the calorific value and corrected fuel flow, a tracking relay connected to the regulator for regulating one of the flows of fuel or air, an element incorporated with said furnace for measuring the temperature within said furnace and a furnace temperature controller which is responsive to signals from said furnace temperature measuring element and which directly regulates that flow not regulated by the tracking relay.

15. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, a first metering orifice in said air line, a second metering orifice in said fuel line, the regulator being responsive to changes in differential pressure in the air stream at the first metering orifice and to changes in differential pressure in the fuel stream at the second metering orifice, an air temperature variation signaling instrument positioned to be responsive to variations in temperature of the air to be admixed with the fuel, a fuel temperature variation signaling instrument positioned to be responsive to variations of the temperature of the fuel to be admixed with the air, a control device which is connected to said calorific value meter and is responsive to the calorific value of the fuel, and to signals from the temperature-responsive instruments, said control device governing said regulator to vary the proportions of air and fuel both in accordance with variations in the calorific value of the fuel and in accordance with variations in the temperature of the air and fuel, a tracking relay connected to the regulator for regulating one of the flows of fuel and air, an element incorporated with said furnace for measuring the temperature within said furnace, control means for limiting maximum burner input during periods of low fuel availability and a furnace temperature controller which is responsive to signals from said furnace temperature measuring element and to the control means for limiting maximum burner input and which directly regulates that flow not regulated by the tracking relay, the tracking relay being responsive to signals from both said regulator and said furnace temperature controller.

16. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, an air metering orifice in said air line, a fuel metering orifice in said fuel line, said regulator being responsive to changes in differential pressure in the air stream at said air metering orifice and to changes in differential pressure in the fuel stream at said fuel metering orifice, a control device which is connected to said calorific value meter and is responsive to variations in the calorific value of the fuel and to variations in the temperature of the fuel, said control device governing said regulator to vary the proportions of air and fuel in accordance with variations in the calorific value of the fuel, a fuel flow meter for determining the volumetric flow of fuel, a recorder connected to said fuel flow meter, a calorific value—fuel flow integrator which is connected to said calorific value meter and said fuel flow meter and which is connected to and governs said recorder, whereby said recorder indicates heat input to said furnace as the product of fuel flow multiplied by calorific value, a fuel valve in said fuel line for regulating the flow of fuel to be admixed with the air, an air valve in said air line for regulating the flow of air to be admixed with the fuel, a tracking relay connected to said regulator for causing one or the other of said fuel and air flow valves to be positioned, a second relay for sensing the position of the valve caused to be positioned by the tracking relay and sending a signal that is related to the position of that valve, a ratio totalizer connected to said second relay for limiting maximum burner input during periods of low fuel availability, said ratio totalizer receiving the signal from said second relay, an element incorporated with said furnace for measuring the temperature within said furnace, and a furnace temperature controller which is responsive to signals from said furnace temperature measuring element and from said ratio totalizer and which diectly regulates that one of said fuel and air valves not caused to be positioned by said tracking relay, said tracking relay being responsive to signals from both said regulator and said furnace temperature controller, the elements of the combination thus being so interconnected and interresponsive as to maintain optimum fuel-air ratios even during periods when the fuel supply is insufficient to maintain optimum furnace temperatures.

17. In apparatus for burning fuel having a widely varying calorific value, in combination, a fuel line, a sampling system connected to said fuel line for sampling fuel supplied by said fuel line, a calorific value meter for determining and signaling the calorific value of the sampled fuel, a burner for combustion of the fuel in admixture with air, an air line, said burner being connected to said fuel line and said air line, a regulator for determining the proportions of air and fuel admixed for combustion, an instrument responsive to the temperature of the air to be mixed with the fuel, a fuel temperature variation signaling instrument incorporated with said fuel line and responsive to variations in temperature of the fuel to be admixed with the air, a control device which is normally connected to said calorific value meter and is responsive to variations in the calorific value of the fuel and to signals from the temperature-responsive instruments, said control device automatically governing said regulator to vary the proportions of air and fuel both in accordance with variations in the calorific value of the fuel and in accordance with the variations in the temperatures of the fuel and the air, a solenoid operated shut-off valve in said sampling system, and a plurality of circuits each including contacts closeable upon the occurrence of a condition in said sampling system to operate said shut-off valve thereby stopping the flow of sampled fuel to the said calorific value meter, and to cause said control device to govern said regulator in accordance to a fixed fuel-air ratio.

18. In apparatus for burning fuel having a widely varying calorific value, in combination, a furnace, a fuel line for supplying fuel to heat said furnace, a sampling system connected to said fuel line for constantly sampling fuel therefrom, a calorific value meter connected to said sampling system for constantly determining the calorific value of the sampled fuel, a burner incorporated with said furnace for combustion of the fuel in admixture with air, an air line, said burner being connected to said fuel line and to said air line, a regulator for determining the proportions of air and fuel admixed for combustion, an air metering orifice in said air line, a fuel metering orifice in said fuel line, said regulator being responsive to changes in the differential pressure in the air stream at said air metering orifice and changes in differential pressure in the fuel stream at said fuel metering orifice, a control device which is connected to said calorific value meter and is responsive to variations in the calorific value of the fuel, said control device governing said regulator to vary the proportions of air and fuel in accordance with variations in the calorific value of the fuel, a fuel valve in said fuel line for regulating the flow of fuel to be admixed with the air, an air valve in said air line for regulating the flow of air to be admixed with the fuel, said regulator causing one or the other of said fuel and air flow valves to be positioned, means sensing the position of the valve caused to be positioned by the regulator and sending a signal that is related to the position of that valve, a ratio totalizer connected to said valve position sensing means for limiting maximum burner input during periods of low fuel availability, said ratio totalizer receiving the signal from said means, an element incorporated with said furnace for measuring the temperature within said furnace, and a furnace temperature controller which is responsive to signals from said furnace temperature measuring element and from said ratio totalizer and which directly regulates that one of said fuel and air valves not caused to be positioned by said regulator, the elements of the combination thus being so inter-connected as to maintain optimum fuel-air ratios even during periods when the fuel supply is insufficient to maintain optimum furnace temperature.

References Cited in the file of this patent

UNITED STATES PATENTS

| | | |
|---|---|---|
| 1,482,091 | Packard | Jan. 29, 1924 |
| 2,067,645 | Pinkerton | Jan. 12, 1937 |
| 2,153,222 | Wunsch | Apr. 4, 1939 |
| 2,193,240 | Schmidt | Mar. 12, 1940 |
| 2,296,255 | Bloom | Sept. 22, 1942 |
| 2,298,257 | Reaser | Oct. 6, 1942 |
| 2,349,521 | Schmidt | May 23, 1944 |
| 2,352,584 | Ziebolz | June 27, 1944 |
| 2,684,459 | Brown | July 20, 1954 |